(No Model.)
E. T. LIPPERT.
SAW.
No. 497,499. Patented May 16, 1893.
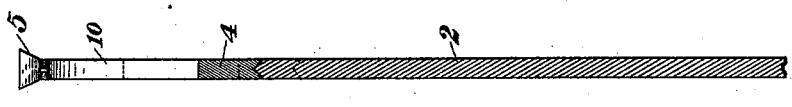
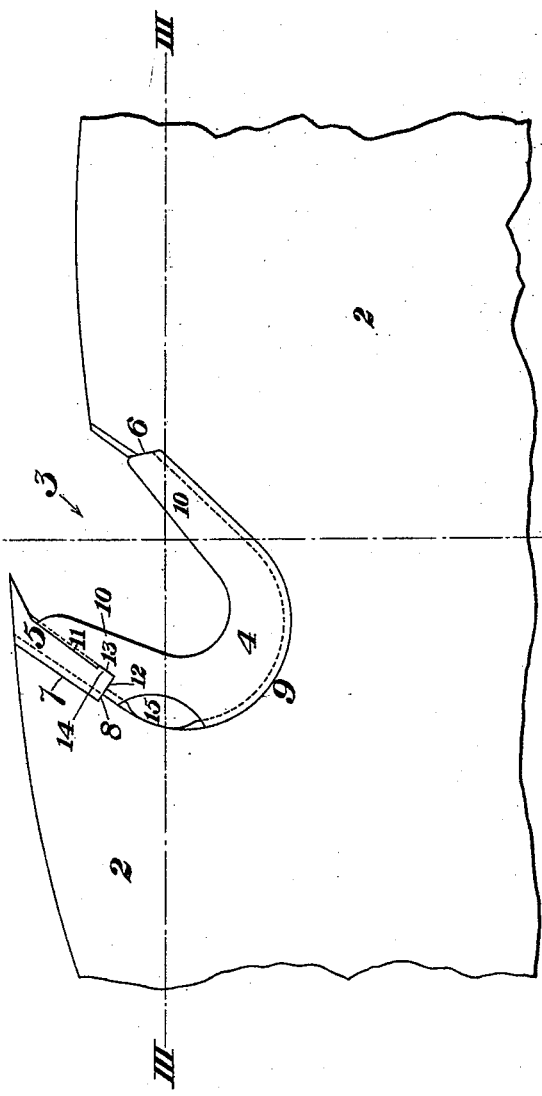
WITNESSES
INVENTOR
Ernst T. Lippert
by W. Bakewell & Sons
his attorneys

UNITED STATES PATENT OFFICE.

ERNST T. LIPPERT, OF PITTSBURG, PENNSYLVANIA.

SAW.

SPECIFICATION forming part of Letters Patent No. 497,499, dated May 16, 1893.

Application filed December 3, 1892. Serial No. 453,925. (No model.)

*To all whom it may concern:*

Be it known that I, ERNST T. LIPPERT, of Pittsburg, in the county of Allegheny and State of Pennsylvania, have invented a new and useful Improvement in Saws, of which the following is a full, clear, and exact description, reference being had to the accompanying drawings, forming part of this specification, in which—

Figure 1 is a plan view of a section of a saw plate provided with my improved tooth-holder. Fig. 2 is a vertical sectional view on the line II—II of Fig. 1; and Fig. 3 is a longitudinal sectional view on the line III—III of Fig. 1.

My invention relates to an improvement in insertible saw-tooth holders, and it consists in a spring holder adapted to be inserted in a recess in the saw plate so as to securely clamp the tooth in position and so constructed as to avoid any wear on the saw-plate recess or edges of the holder or tooth in the insertion and removal of the teeth.

I will now describe my invention so that others skilled in the art may manufacture and use the same.

In the drawings, 2 represents a section of the saw-plate, in which is formed the U-shaped recess 3, for the reception of the spring-holder 4 and insertible bit or tooth 5. This recess 3 is provided on one side with the shoulder 6, against which the end of one arm of the U-shaped spring holder 4 engages. On the other side of the recess 3 is an offset 7, against the side of which the bit 5 rests, the bottom of the bit resting partially on the shoulder 8 formed by the bottom of the offset. The side of the recess 3 and the offset 7 are provided with a V-tongue, which fits in a V-recess in the outer edges of the spring-holder 4 and the tooth 5. This holder 4 is substantially U-shaped, having the rounded base 9 and arms 10, and is formed of spring steel. In one of the arms 10 is formed an offset 11 corresponding to the offset 7 in the plate 2, forming a recess between the holder 4 and the edge of the plate 2 for the insertion of the saw bit or tooth 5, and at the bottom of this offset is the square shoulder 12, against which the base of the tooth rests, and a notch 13 which engages with the lug or projection 14, formed on the face of the tooth 5. One of the arms 10 of this holder is cut away at 15, forming an opening for the reception of a wrench, by means of which the holder may be sprung back to permit the insertion or removal of the tooth.

The holders 4 and teeth 5 are inserted in and removed from the saw-plate as follows:— When it is desired to place the holder in the recess of the saw-plate, the end of the arm 10, which engages with the shoulder 6, is placed in position, and the two arms 10 of the holder are bent toward each other, allowing the holder to spring into the recess 3. The holder being placed in the recess in the saw-plate, the tooth 5 is inserted by springing the arms 10 of the holder toward each other by a wrench inserted in the opening 15 to allow the tooth to be pushed down between the holder and the saw-plate in the offsets 7 and 11. The holder and tooth are therefore inserted without any turning of the tooth or holder in the saw-plate recess, and not only is the wear and lessening of the frictional holding power prevented, but the tooth is also held by fixed pressure, the holder being immovable in either direction in a line parallel or coincident with the line of projection of the saw tooth. Owing to this construction, it is impossible to remove the holder without first removing the tooth 5.

Although the base 9 of the holder 4 may most conveniently be formed on the arc of a circle, yet the straight arms 10 extending therefrom prevent any turning of the holder in the recess 3 when the tooth 5 is in position, and when the tooth is removed, only such movement of the holder is possible as to allow the end of the arm 10 to pass clear of the shoulder 6.

I am aware that spring saw-tooth holders are not new, and I am also aware of the Newton and other holders, in which the holder is arranged to turn in the saw plate and bind the saw tooth by spring pressure, and I therefore do not desire to claim broadly a spring saw tooth holder.

What I claim, and desire to secure by Letters Patent, is—

1. In a saw, a tooth-holder having its base formed on the line of a segment of a circle, and having tangential spring arms, a tooth cavity, a tooth-retaining notch, and a wrench-cavity formed in one of the arms, in combination with a recess in the saw-plate, said recess having a shoulder for a bearing for one of the arms of the holder; substantially as described.

2. In a saw, the combination of a tooth-holder having its base formed on the line of the segment of a circle and having tangential spring arms, a groove formed in the edge of the holder, a projection along the edge of the recess adapted to fit in the groove, a shoulder formed in the recess against which one of the holder-arms rests, and a tooth adapted to engage with the holder; substantially as described.

In testimony whereof I have hereunto set my hand.

ERNST T. LIPPERT.

Witnesses:
W. B. CORWIN,
JAMES K. BAKEWELL.